(12) United States Patent
MacDonald et al.

(10) Patent No.: US 6,937,490 B2
(45) Date of Patent: *Aug. 30, 2005

(54) DUAL INPUT AC AND DC POWER SUPPLY HAVING A PROGRAMMABLE DC OUTPUT UTILIZING A MODULAR PROGRAMMABLE FEEDBACK LOOP

(75) Inventors: Gilbert MacDonald, Queen Creek, AZ (US); Scott Smith, Phoenix, AZ (US)

(73) Assignee: Mobility Electronics, Inc., Scottsdale, AZ (US)

( * ) Notice: Subject to any disclaimer, the term of this patent is extended or adjusted under 35 U.S.C. 154(b) by 215 days.

This patent is subject to a terminal disclaimer.

(21) Appl. No.: 10/790,654

(22) Filed: Mar. 1, 2004

(65) Prior Publication Data

US 2004/0170039 A1 Sep. 2, 2004

Related U.S. Application Data

(63) Continuation of application No. 10/072,074, filed on Feb. 8, 2002, now Pat. No. 6,700,808.
(60) Provisional application No. 60/335,785, filed on Oct. 31, 2001.

(51) Int. Cl.[7] .............................................. H02M 1/10
(52) U.S. Cl. ....................................................... 363/142
(58) Field of Search .......................... 363/37, 65, 142; 307/64, 66, 72, 73, 75

(56) References Cited

U.S. PATENT DOCUMENTS

| | | |
|---|---|---|
| 1,741,265 A | 12/1929 | Wappler |
| 2,427,111 A | 9/1947 | Tolmie |
| 2,792,559 A | 5/1957 | Maberry |
| 3,201,617 A | 8/1965 | Pacoroni et al. |
| 3,256,466 A | 6/1966 | Trolio et al. |
| 3,275,855 A | 9/1966 | Wright |

(Continued)

FOREIGN PATENT DOCUMENTS

| | | |
|---|---|---|
| EP | 1 001 513 A2 | 5/2000 |
| EP | 1 107 437 A2 | 6/2001 |
| EP | 1 122 873 A2 | 8/2001 |

OTHER PUBLICATIONS

Philip Cooke, "Control Loop Interactions for Secondary Side Post Regulators" Applied Power electronics Conference and Exposition 1998 pp. 369–376.

"Super Selection of Power Adapters" Radio Shack Brochure pp. 128.

(Continued)

*Primary Examiner*—Adolf Berhane
(74) *Attorney, Agent, or Firm*—Jackson Walker LLP; Robert C. Klinger

(57) ABSTRACT

A dual input AC/DC power converter (10) having dual inputs (12, 14) adapted to receive both an AC and DC input and provide a selectable DC voltage output (16) and a second DC output (18). The dual input AC/DC power converter (10) comprises a power converter circuit (20) having an AC-to-DC converter (22), a DC-to-DC booster converter (24), a feedback circuit (26), a filter circuit (25) and a DC-to-DC buck converter (28). Advantageously, the power converter (10) resolves many of system management problems associated with carrying all of the different interface components necessary to power a wide variety of mobile products from either an AC or DC power supply. In addition, the power converter (10) also advantageously includes dual output voltage terminals (16/18) to allow for multiple mobile devices of varying power requirements to be powered, simultaneously, by a single converter.

4 Claims, 5 Drawing Sheets

U.S. PATENT DOCUMENTS

| | | |
|---|---|---|
| 3,281,747 A | 10/1966 | Winsand |
| 3,452,215 A | 6/1969 | Alessio |
| 3,484,864 A | 12/1969 | Bernstein et al. |
| 3,581,480 A | 6/1971 | O'Conner et al. |
| 3,784,956 A | 1/1974 | Gassman |
| 3,870,946 A | 3/1975 | Sandorf |
| 3,996,546 A | 12/1976 | Hugly |
| 4,089,041 A | 5/1978 | Lockard |
| 4,164,665 A | 8/1979 | Berger |
| 4,239,319 A | 12/1980 | Gladd et al. |
| 4,258,969 A | 3/1981 | Stallard |
| 4,442,382 A | 4/1984 | Fleck |
| 4,622,627 A | 11/1986 | Rodriguez et al. |
| 4,713,642 A | 12/1987 | Wolfe et al. |
| 4,885,674 A | 12/1989 | Varga et al. |
| 4,890,214 A | 12/1989 | Yamamoto |
| 5,019,954 A | 5/1991 | Bourgeault et al. |
| 5,040,990 A | 8/1991 | Suman et al. |
| 5,044,964 A | 9/1991 | Minerd et al. |
| 5,092,788 A | 3/1992 | Pristupa, Jr. et al. |
| 5,181,859 A | 1/1993 | Foreman et al. |
| 5,245,220 A | 9/1993 | Lee |
| 5,290,191 A | 3/1994 | Foreman et al. |
| 5,347,211 A | 9/1994 | Jakubowski |
| 5,369,352 A | 11/1994 | Toepfer et al. |
| 5,412,248 A | 5/1995 | Murari et al. |
| 5,414,610 A | 5/1995 | Brainard |
| 5,428,288 A | 6/1995 | Foreman et al. |
| 5,455,734 A | 10/1995 | Foreman et al. |
| 5,479,331 A | 12/1995 | Lenni |
| 5,510,691 A | 4/1996 | Palatov |
| 5,621,299 A | 4/1997 | Krall |
| 5,636,110 A | 6/1997 | Lanni |
| D391,227 S | 2/1998 | Dickey |
| 5,715,153 A | 2/1998 | Lu |
| 5,715,156 A | 2/1998 | Yilmaz et al. |
| 5,731,693 A | 3/1998 | Furmanczyk |
| 5,770,895 A | 6/1998 | Kumasaka |
| 5,801,513 A | 9/1998 | Smith et al. |
| 5,838,110 A | 11/1998 | Pezzani |
| 5,886,422 A | 3/1999 | Mills |
| 5,901,056 A | 5/1999 | Hung |
| 5,949,213 A | 9/1999 | Lanni |
| 5,982,652 A * | 11/1999 | Simonelli et al. ............ 363/142 |
| 6,064,177 A | 5/2000 | Dixon |
| 6,091,611 A | 7/2000 | Lanni |
| 6,137,280 A | 10/2000 | Ackermann et al. |
| 6,172,884 B1 | 1/2001 | Lanni |
| 6,225,708 B1 | 5/2001 | Furukawa et al. |
| 6,297,972 B1 * | 10/2001 | Chen ........................... 363/37 |
| 6,650,560 B2 * | 11/2003 | MacDonald et al. ......... 363/142 |
| 6,700,808 B2 * | 3/2004 | MacDonald et al. ......... 363/142 |
| 2001/0030879 A1 | 10/2001 | Greenfeld et al. |
| 2002/0067630 A1 | 6/2002 | Tokunaga et al. |
| 2002/0071290 A1 | 6/2002 | Youn et al. |

OTHER PUBLICATIONS

Press Release of Empire Engineering, Electronic Design and Management, Jul. 5, 1995—San Luis Obispo, CA USA, pp1–2.

Description of the "Smart Adapter System" Nesco Battery Systems, 1995; pp. 1–2.

Macworld, "On the Road", vol. 12, No. 7 Jul. 1995, pp 141–142, 5/9/1 (Item 1 from file: 15) Dialog(R) File 15: ABI/INFORM(R).

Empire Engineering San Luis Obispo, CA; SmartCord Assembly and Schematic Drawing: Feb. 9, 1996 pp 1–3.

Empire Engineering, "Universal DC Adapter for Portable Computer Power" Electronic Design and Management; Jan. 1995.

Press Release "NewXtenderoe Adapter Lets Portable Computer Users Plug into Computing Power on Airplanes and in Cars" Irvine, CA Apr. 30, 1997, 2 pages.

BenchMarq; Fast–Charge IC, bq2002C, Sep. 1997; pp. 1–9 thru 1–16.

Electronic Products, "Smart External Adapter Meets Many Portable Power Needs" May 1995, 1 page.

Minwa Product Information, MW182, 1993, 1 page.

Smart Adapter Power Converter Schematic, Empire Engineering, Feb. 27, 1995.

Smart Adapter Power Converter Schematic, Empire Engineering, Apr. 27, 1997.

Specification Change Notice, General Dyamics, Oct. 26, 1979.

* cited by examiner

DUAL INPUT AC AND DC POWER SUPPLY HAVING A PROGRAMMABLE DC OUTPUT UTILIZING A MODULAR PROGRAMMABLE FEEDBACK LOOP

CROSS REFERENCE TO RELATED APPLICATIONS

The present application is a continuation of Ser. No. 10/072,074 filed Dec. 8, 2002 U.S. Pat. No. 6,700,808 and is related to and claims priority from commonly assigned U.S. patent application Ser. No. 10/005,961 filed Dec. 3, 2001, and claims benefit of 60/335,785 Oct. 31, 2001 the teachings of which are incorporated herein by reference.

TECHNICAL FIELD

The present invention generally relates to the field of power converters, and more particularly to a dual input AC and DC to programmable DC output power converter.

BACKGROUND OF THE INVENTION

As the use of mobile electronic products, such as PC notebooks, PDAs, cellular telephones and the like, continues to increase, the need for low cost, compact power supplies to power and recharge these products also continues to increase. Most manufacturers of mobile products typically include plug-in power adapters along with these mobile products to help facilitate the power supply needs of their customers.

Today's power adapters are typically AC-to-DC, or DC-to-DC power converters which are configured to either step-up or step-down the DC voltage input delivered to the mobile device. With AC-to-DC adapters, for example, users can power most mobile devices by simply plugging the adapter into a simple AC wall outlet commonly found in most homes or offices. Similarly, when only DC input power is available, such as in an automobile or airplane, users can still power their mobile devices by simply using a standard, off-the-shelf DC-to-DC adapter. Normally, both adapters are designed and tailored to provide a regulated DC output voltage, which typically range from between 5 VDC to 30 VDC depending on the kind of mobile device being powered.

Although these power adapters conveniently provide direct power and recharging capabilities, users are often required to carry separate adapters to provide power to each individual mobile device. This often means that users have to carry multiple adapters: one for an AC input power source, and another for a DC input power source, moreover, users typically carry multiple adapters to power multiple devices. Thus, by carrying more than one device at a time, users of mobile product users are forced to carry more than one bulk power supply adapter.

Accordingly, there exists a need for a power converter that resolves the system management problems associated with carrying all of the different power supply components necessary to power a wide variety of mobile or portable devices. Moreover, such a power converter would advantageously encompass serving the power supply needs of several different mobile devices, as it would supply a filtered and regulated DC output voltage in response to either an AC and DC input voltage. Moreover, by having a power convert or having multiple output terminals, users have the ability of providing power to several mobile devices of varying power requirements, simultaneously, regardless of whether the input voltage is AC or DC.

SUMMARY OF THE INVENTION

The present invention achieves technical advantages as a power converter capable of supplying dual DC output voltages derived from either an AC input voltage or a DC input voltage. The power converter can be externally programmable to cover a wide range of voltage and current combinations, suitable for a wide variety of mobile product offerings. Moreover, the power converter also resolves the management problems associated with having several different interface components necessary to power a wide variety of mobile products. By having dual output voltage connections, mobile product users can simultaneously power multiple mobile devices of varying power specifications.

In one preferred embodiment, the invention is a power converter having a first circuit adapted to receive an AC input voltage and provide a first programmable DC output voltage. The power converter includes a second circuit adapted to provide a second programmable DC output voltage in response to a DC input voltage. The power converter also includes a third circuit that, in response to receiving the first and second DC output voltages, generates a selectable DC output voltage at a first output. Moreover, the third circuit generally comprises a feedback circuit and is adapted to interface with a removable program module. This programming module feature allows users of the power converter to selectively establish the voltage level of the DC output voltage. The power converter also includes a fourth circuit that is coupled to first output. The fourth circuit provides a second DC output voltage as a second output which is independent of, and substantially lower than the selectable DC output voltage.

In another embodiment, the invention is a method of generating at least two independently selectable DC output voltages in response to an AC input voltage or a DC input voltage. This method is achieved by the act of converting the received AC or DC input voltage to a first programmable DC output voltage at a first output. The converting act is then followed by a receiving act wherein the first DC output voltage is received by a converting circuit. The converting circuit initiates a generating act generating a second DC output voltage that is independent of and substantially lower than the programmable DC output voltage.

BRIEF DESCRIPTION OF THE DRAWINGS

Advantages of the invention and the specific embodiments will be understood by those of ordinary skill in the art by reference to the following detailed description of preferred embodiments taken in conjunction with the drawings, in which.

DETAILED DESCRIPTION OF THE PREFERRED EMBODIMENT

The numerous innovative teachings of the present applications will be described with particular reference to the presently preferred exemplary embodiments. However, it should be understood that this class of embodiments provides only a few examples of the many advantageous uses and innovative teachings herein. In general, statements made in the specification of the present application do not necessarily delimit any of the various claimed inventions. Moreover, some statements may apply to some inventive features, but not to others.

Figure 1A:
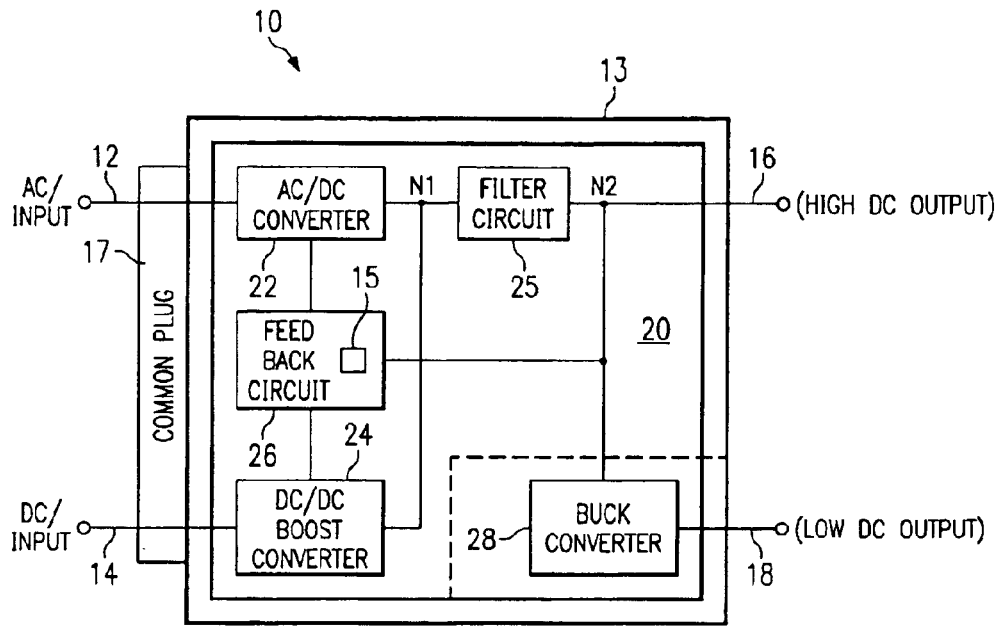
FIG. 1A shows a block diagram of a dual input AC and DC power converter having dual DC voltage outputs in accordance with the present invention.

There is shown in FIG. 1A a block diagram of a dual input AC/DC power converter 10 having dual programmable DC voltage outputs in accordance with the present invention. Preferably, the dual input AC/DC power converter 10 comprises a power converter circuit 20 having an AC-to-DC converter 22, a DC-to-DC booster converter 24, a feedback circuit 26, a filter circuit 25 and a DC-to-DC buck converter 28. The power converter circuit 20 is seen housed in housing 13 and advantageously provides a first programmable DC output voltage at DC output terminal 16 and a second programmable DC output voltage at terminal 18. Both of these DC output voltages may be generated as a function of both AC and DC input voltages.

In operation, the AC-to-DC converter 22 receives an AC signal via input terminal 12 and provides a regulated DC output voltage at node N1. Similarly, the DC-to-DC booster converter 24 may receive a DC input voltage at its input via input terminal 14 and may also provide a regulated DC output voltage at node N1.

Input terminals 12 and 14 are integrated into a single common connector 17 such that different power cords adapted to receive input power from different sources are received by the common connector 17. For instance, DC power from an airplane or car power source are wired to couple to input 12 and AC source is wired to couple to input 14. In a selected embodiment, the AC-to-DC converter 22 is adapted to generate a DC output voltage of between 15 VDC and 24 VDC in response to an AC input voltage at terminal 12 ranging between 90 VAC and 265 VAC. Likewise, the DC-to-DC booster converter 24 is adapted to provide a DC output voltage which is substantially similar to that of converter 22, but which is generated in response to a DC input voltage supplied at input terminal 14. Preferably, DC-to-DC booster converter 24 is adapted to receive a voltage in the range of between 11 VDC and 16 VDC. Advantageously, AC-to-DC conversion, via AC-to-DC converter 22, allows users of the power converter 10 to power high-power mobile devices, such as a laptop computer wherever AC input power is available, such as in the home or office, for example. Conversely, the DC-to-DC booster converter 24 of the power converter 10 is capable of powering similar high-power devices by stepping up most low amplitude DC input signals, such as those found in automobile and/or airplane environments.

As shown, filter circuit 25 has its input tied to the respective outputs of the converter 22 and 24. In a preferred embodiment, the filter circuit is adapted to provide a filtered DC output voltage at second node N2, which, thereafter, feeds output terminal 16, at an output power of 75 watts, for example.

The single feedback circuit 26 is shown coupled to the output of filter circuit 25 at node N2. In a preferred embodiment, the feedback 26 circuit, through a single feedback loop, regulates the voltage level of the filtered DC output voltages generated by both converters 22 and 24. Additionally, the feedback circuit 26 is adapted to receive a removable programming module that allows mobile device users to provide a selectable DC output voltage at output 16 via node N2. The programming module comprises a key 15 comprising a resistor, wherein different associated values of the resistor establish different associated DC output voltages at output 16. By allowing users to selectively change the voltage level of the filtered DC output voltage, the power converter 10 may be adapted to power a variety of different mobile electronic devices, having different associated power requirements. Moreover, the power converter's 10 programming module may also be adapted to provide the additional function of output current limiting.

Figure 1B:
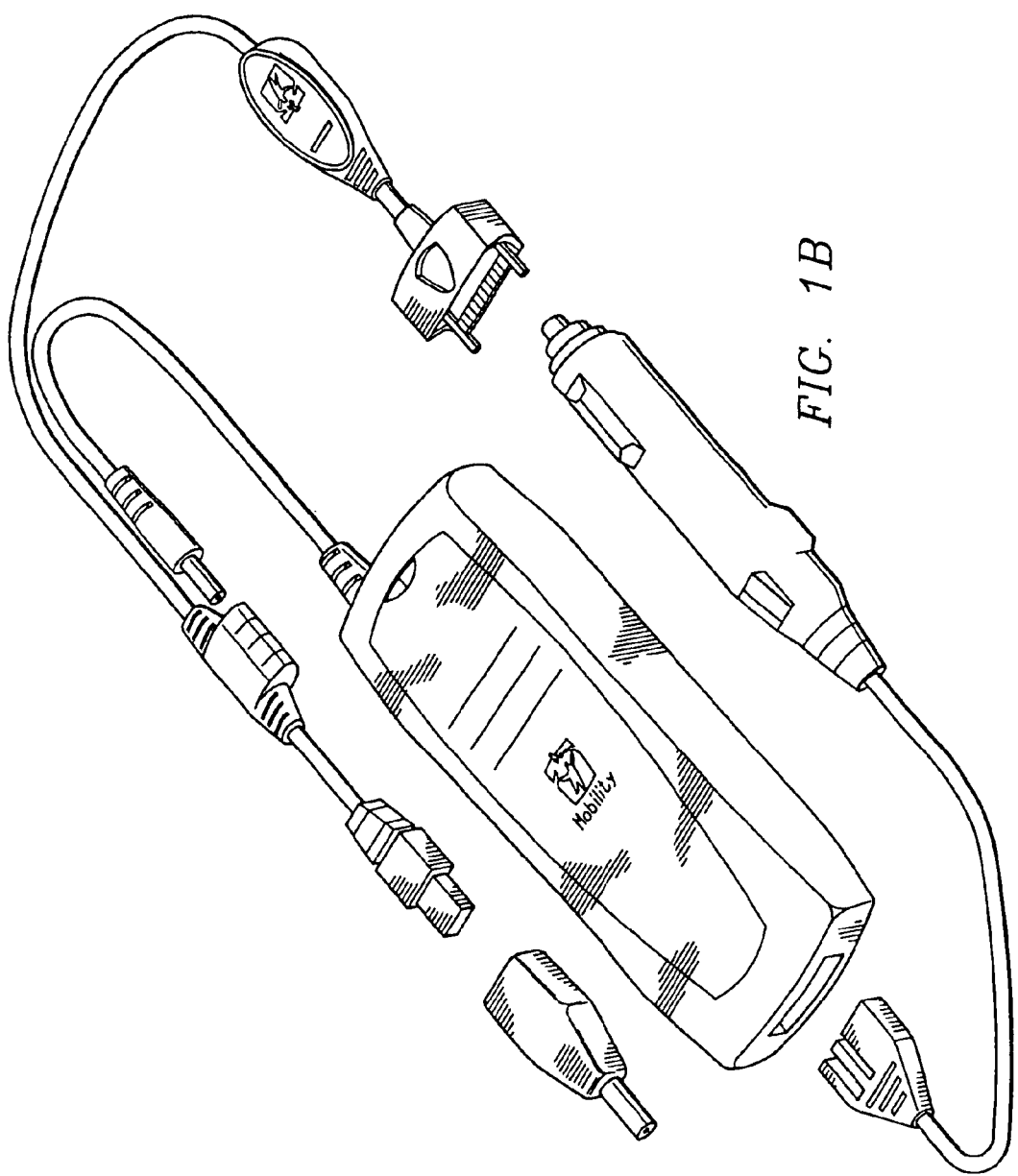
FIG. 1B shows an exploded view of the converter with the detachable buck circuit.

The DC-to-DC buck converter 28 has its input coupled at node N2, providing a second DC output voltage that is then fed to output terminal 18, having an output power of 10 watts, for example. Preferably, buck converter 28 discreetly steps down the filtered DC voltage and produces a second DC output voltage at a separate output terminal 18. In a selected embodiment, the buck converter 28 steps down the filtered DC output voltage to a range of about 3 VDC and 15 VDC. Advantageously, this second DC output voltage generated by converter 28 is independent of, and substantially lower than the DC output voltage at terminal 16. This allows users of the present invention to power not only a high-power peripheral, such as a laptop computer, but also, a second, low-power peripheral, such as a cell phone, PDA, and the like. Moreover, the present invention allows for these peripherals to be powered simultaneously by a single converter, regardless if the input voltage is AC or DC. The buck converter 28 is physically detachable from the main housing 13 as shown in FIG. 1B, allowing different buck circuits providing different output voltages to be selectively attached to housing 13 and tap the DC output voltage from output terminal 18.

Figure 2A:
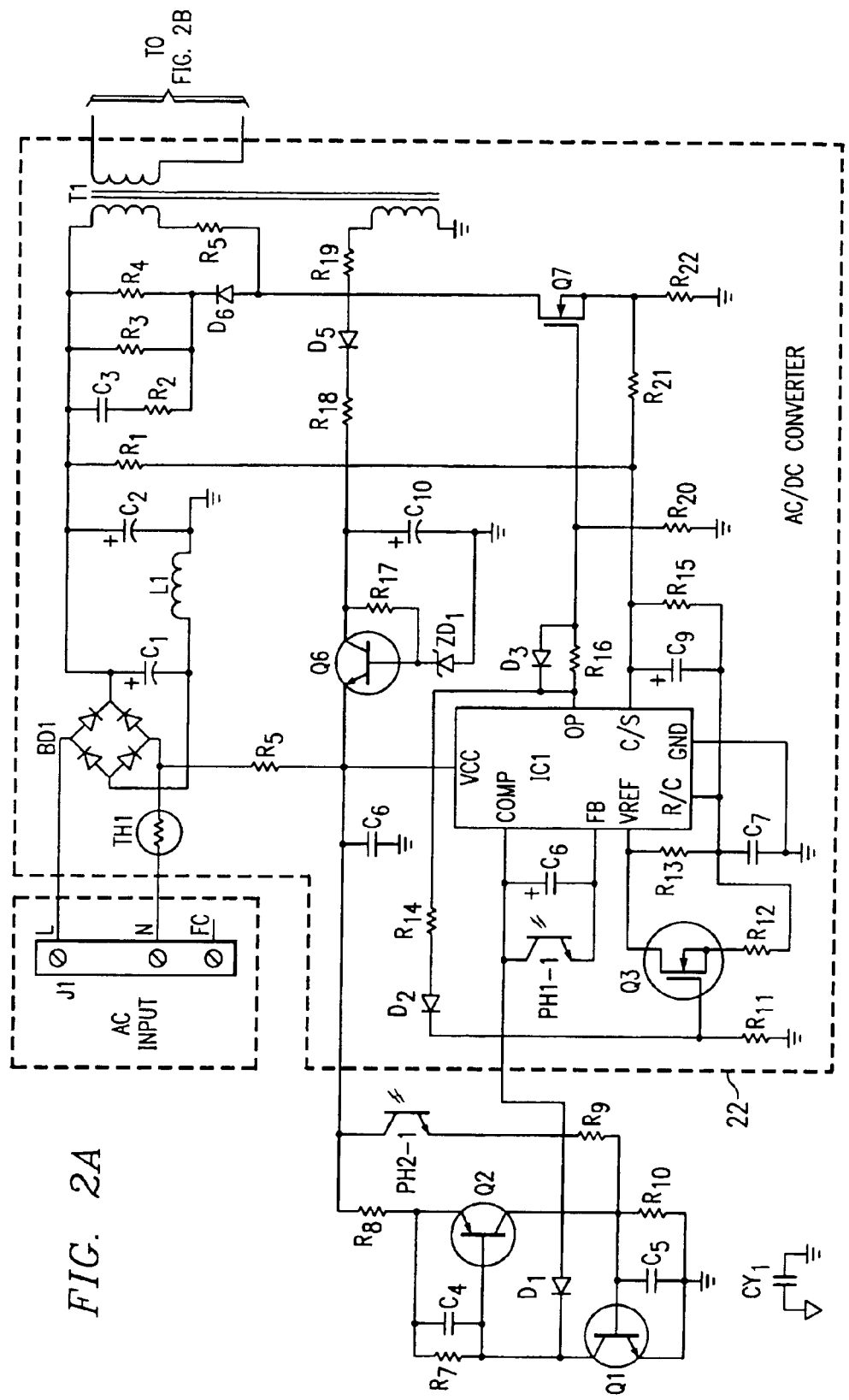
FIG. 2 shows a schematic diagram of the power converter circuit as illustrated in FIG. 1 in accordance with the present invention.
Figure 2B:
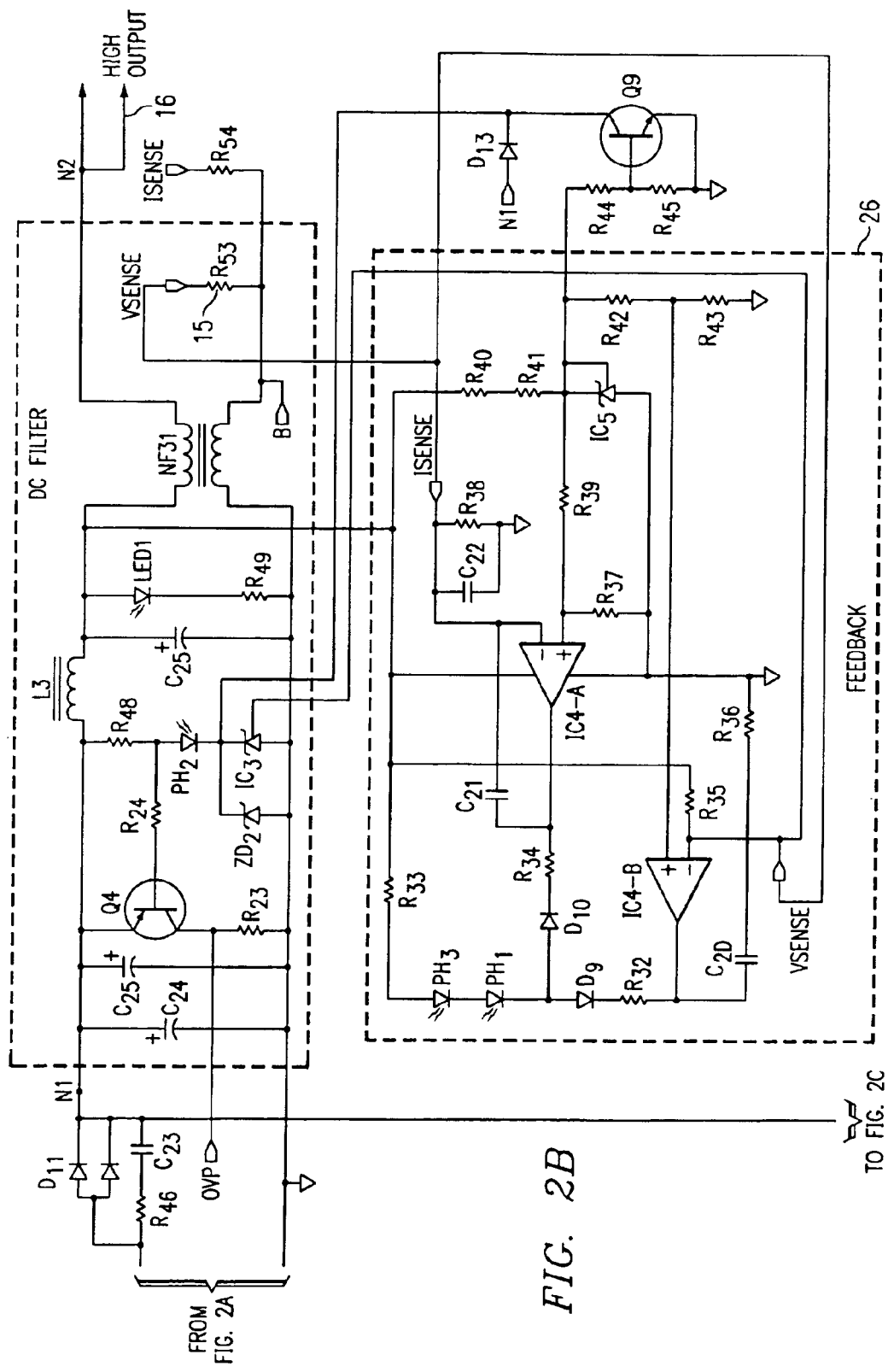
Figure 2C:
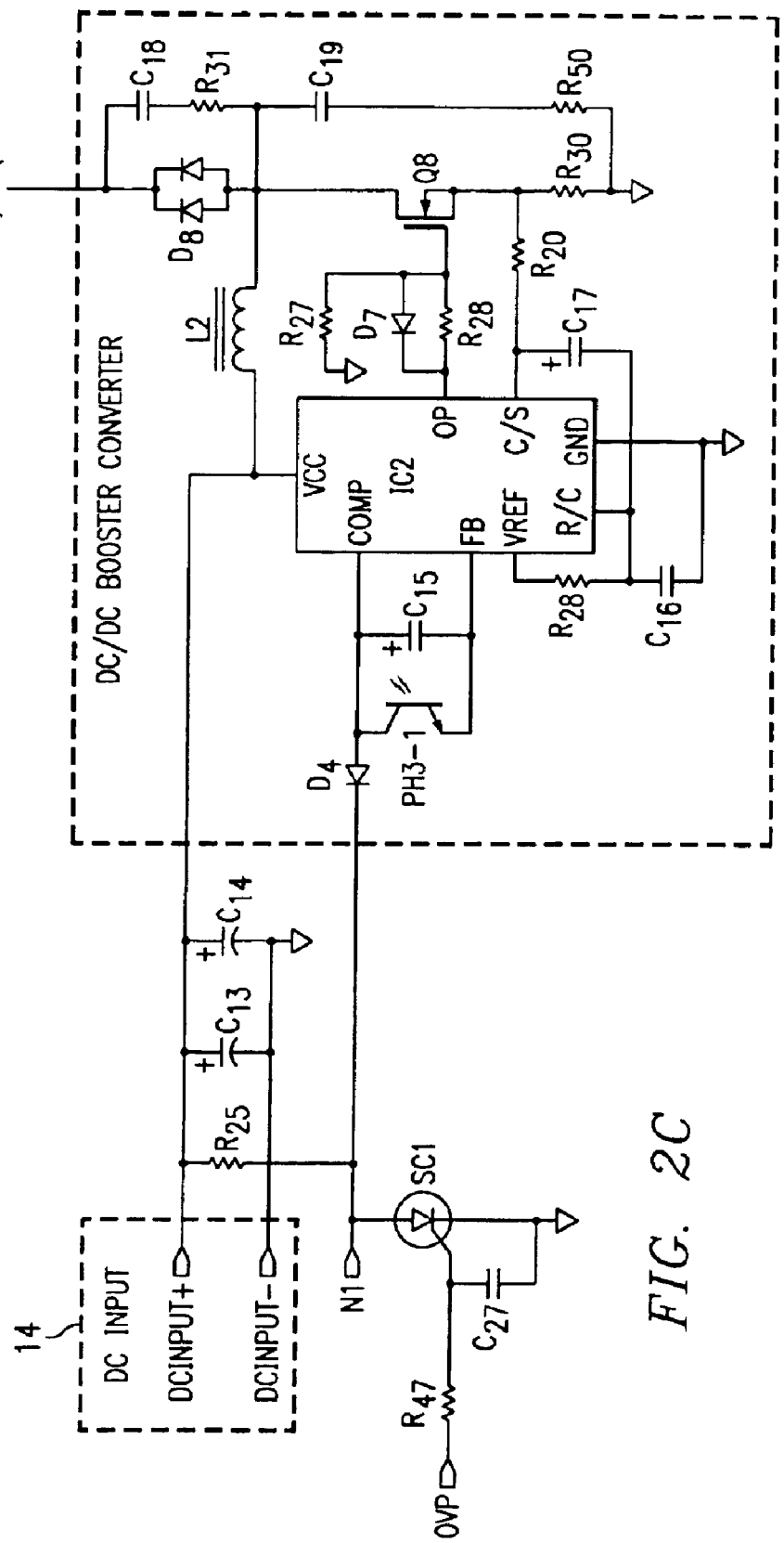

Referring now to FIG. 2 there is shown a schematic diagram of the power converter circuit 20 of the dual input AC/DC power converter 10 as depicted in FIG. 1 in accordance with an exemplary embodiment of the present invention. As described herein in greater detail, the power converter circuit 20, in a preferred embodiment, comprises three separate converters: AC-to-DC power converter 22, DC/DC boost converter 24, and DC-to-DC buck converter 28.

AC-to-DC Converter

The AC-to-DC power converter 22 includes a true off line switcher which is configured in a fly-back topology. Full-wave rectification of an AC input signal, received at input terminal 12, occurs using a full-wave bridge rectifier BD1 and a filter capacitor C1, which creates a DC voltage bus from which the switcher operates. Inductor L1 offers additional EMI filtering of the AC signal after the signal has been rectified through the full-wave bridge. The AC-to-DC converter 22 also includes a main controller IC1 configured as a current mode pulse-width modulator (PWM). Main controller IC1 is also configured to have a single-ended output with totem pole driver transistors coupled thereto. The AC-to-DC power converter 22 has a main power switch Q1 which drives the main transformer T1. In a preferred embodiment, the transformer T1, Schottky diode D11, and filter capacitors C24 and C25 combine to provide the DC output voltage at node N1.

As noted earlier, filter circuit 25 allows for additional filtering of the DC output voltage derived from node N1. The filter circuit 25 itself comprises inductor L3, capacitor C26 and transformer NF1. Advantageously, the filter circuit 25 produces a filtered DC output voltage at output 16 having less than 100 mv peak-to-peak noise and ripple.

The feedback circuit 26, through a single feedback loop, is capable of regulating the filtered DC output voltages provided by the converters 22 and 24. The feedback circuit 26 is also adapted to be coupled to a removable programming module having a key 15, comprising resistor R53. As such, the present invention allows users to selectively program the DC output voltage later received at output terminal 16. The feedback circuit 26 includes a photocoupler circuit comprising a pair of photocouplers PH1 and PH3 connected in series (i.e., stacked), each being coupled to the outputs of operational amplifiers IC4-A and IC4-B. Advantageously, these photocouplers are arranged along the feedback loop of the feedback circuit 26. Additionally, the feedback circuit 26 efficiently regulates the filtered DC output voltages generated by both converters 22 and 24 through a single feedback loop. In stacking the photo-couplers, the present invention also allows the power converter 10 to maintain proper input/output isolation between respective terminals 12 and 14 and output terminal 16.

Preferably, the output current limiting function of converter 22 is accomplished via integrated circuit IC4A, resistors R33, R37, R38, and R39 and programming resistor R54.

Over voltage protection of AC-to-DC converter 22 is achieved using photocoupler PH2 and zener diode ZD2. In a preferred embodiment, zener diode ZD2 is set at 25V such that when in avalanche mode it causes the transistor side of photocoupler PH2 to bias transistor Q1 into the on state. When it is the on state, transistor Q3 pulls low pin 1 of integrated controller IC1 and pulls the operating duty cycle of the integrated controller towards 0%. This takes the DC output voltage to 0 volts. Also, when transistor Q1 is on, transistor Q2 is also forced on which then forces these two transistors become latched. If transistors Q1 and Q2 are latched, input power must be recycled in order for the power converter 10 to be turned on again.

DC-to-DC Converter

The DC-to-DC converter 24 is configured in a boost topology and utilizes the same kind of integrated controller, IC2, as used in converter 22. In the DC-to-DC converter 24, transistor Q8 acts as the main power switch and diode D6 as the main rectifier. Preferably, inductor L2 is adapted to function as a power boost inductor, which is comprised of a toroid core-type inductor. It should be understood that the cathode leads of diodes D11 and D8 are connected, forming an ORed configuration, requiring only one output filter. Advantageously, this eliminates the board space needed for a second set of filters capacitors.

Like the AC-to-DC converter 22, the DC-to-DC converter 24 is also designed to operate at a frequency of around 80 KHZ. For the AC-to-DC converter 22, the operating frequency is set by resistor R13 and capacitor C7. Likewise, the operating frequency of the DC-to-DC converter 24 are set by resistor R28 and capacitor C28.

The DC-to-DC converter 24 includes an over-voltage protection circuit comprising zener diode ZD2, resistor R23, R24, R48, transistor Q415, and silicon-controlled rectifier SC1. Zener diode ZD2 sets the over-voltage protection point (OVP) which is preferably set at 25 VDC. Generally, there is no current flowing through resistor R48. If, however, when zener diode ZD2 begins to conduct current, the drop across R48 is significant enough to bias transistor Q6 on, pulling its collector terminal high, and thereby turning silicon controlled rectifier SC1 on. When silicon control rectifier SC1 is on, it pulls pin 1 of the integrated controller IC2 low. Thus, if pin 1 of integrated controller IC2 is low, the output drivers thereof are forced to operate at a duty cycle of 0%, thereby producing a DC output voltage of 0 volts at pin 6. Advantageously, the silicon controlled rectifier SC1 functions as a power latch circuit that requires that input power be recycled in order to turn on the power converter 10 if a voltage above 25 VDC is detected at node N1.

The temperature of the housing 13 of the power converter 10 is monitored using a thermistor NTC3. If, for example, there is a corresponding increase in the temperature of the housing 13, it will result in a decrease in the resistive value of thermistor NTC3, thereby causing transistor Q9 to turn on and pull low pin 1 of integrated circuit IC2 of converter 24. Moreover, this causes the photo-coupler PH2 to be biased enough to activate a latch circuit comprising transistors Q1 and Q2 that will shutdown the power converter 22. In addition, the power converter's 10 thermal protection feature is adapted to operate regardless of whether an AC or DC input voltage is being received at their respective input terminals.

Figure 3:
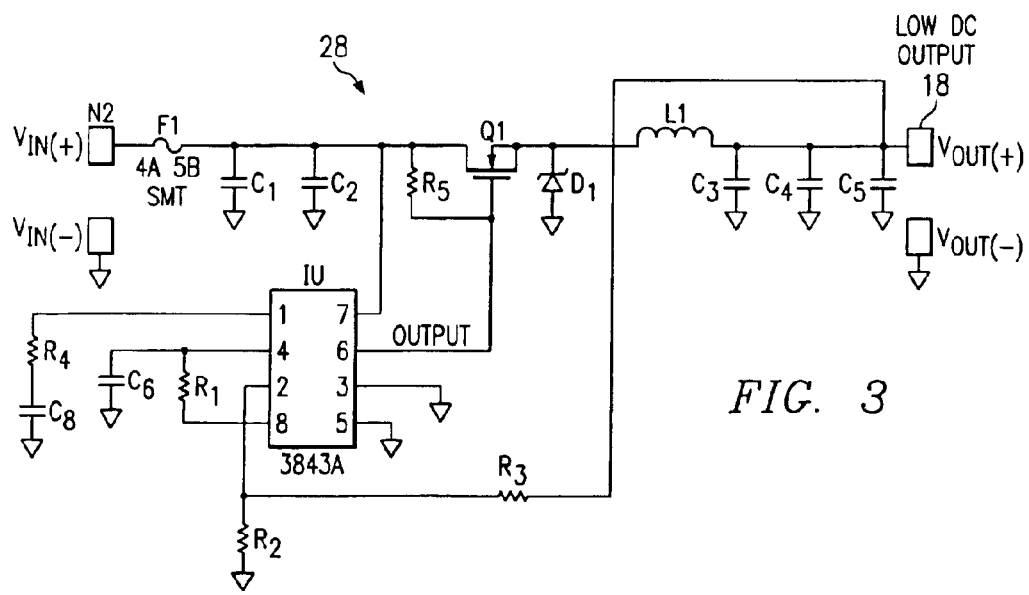
FIG. 3 shows a detailed schematic diagram of a DC-to-DC buck converter circuit in accordance with the present invention.

FIG. 3 shows a detailed schematic diagram of the DC-to-DC buck converter 28 in accordance with the present invention. The buck converter 28 has an integrated circuit controller IC1, similar to converters 22 and 24, which is adapted to generate an on-time duty cycle to power transistor switch Q1. The operating frequency of controller IC1 is set by capacitor C6, which is coupled between pin 4 of IC1 and ground, and resistor R1, which is coupled between pins 4 and 8. In a selected embodiment, the diode D1 functions comprises a Schottky diode and functions as "catch" diode. Inductor L1 is a output power inductor and couples the gate of power transistor Q1 to $V_{out}$. Fuse F1 is shown coupled between $V_{in}$ and the drain terminal of power transistor Q1, and advantageously provides current protection to buck-converter 28.

Furthermore, the input $V_{in}$ of the buck converter 28 is coupled to the output of filter circuit 25 at node N2, wherein $V_{in}$ receives the filtered DC output voltage therefrom. In a preferred embodiment, the buck converter 28 provides a second DC output voltage at $V_{out}$, coupled to output terminal 18. Advantageously, the buck convert 28 discreetly steps down the filtered DC output voltage and provides a second DC output voltage at output terminal 18 which is independent of, and substantially lower than the DC output voltage at output terminal 16. Likewise, the DC output voltage of the buck converter 28 enables users low-power peripherals, such as, a cell phones, a PDAs, and/or similar mobile devices. In a selected embodiment, the buck convert 28 may also be adapted to provide a DC output voltage at output terminal 18 ranging between 3 VDC and 15 VDC, selectively determined as a function of the chosen value of resistor R1 used in the particular buck converter 28, with a total power delivery of 10 watts, for example. As previously mentioned, the buck converter 28 may be housed in a separate, detachable program module that enables users to selectively program the DC output voltage at terminal 18 as a function of different associated buck converter modules.

Though the invention has been described with respect to specific preferred embodiments, many variations and modifications will become apparent to those skilled in the art upon reading the present application. It is therefore the intention that the appended claims be interpreted as broadly as possible in view of the prior art to include all such variations and modifications.

What is claimed is:

1. A power converter, comprising:
    a first circuit converting an AC input voltage to a first DC voltage;
    a second circuit converting a DC input voltage to a second DC voltage; and
    an third circuit having a feedback loop and receiving said first and second DC voltages and, in response thereto, providing a selectable DC output voltage at a first output, wherein said selectable DC output voltage is established as a function of a removable program module, the removable program module selectively establishing a resistor as a part of the feedback loop of the third circuit.

2. The power converter of claim 1 wherein said first and second DC voltages are substantially the same and are provided to a common node.

3. The power converter of claim 1 wherein the third circuit comprises a pulse-width modulator (PWM), the resistor establishing a duty cycle of the PWM.

4. The power converter of claim 1 wherein the resistor is disposed in the removable program module.

* * * * *